United States Patent [19]

Erekson et al.

[11] Patent Number: 4,937,221
[45] Date of Patent: Jun. 26, 1990

[54] MIXED-SOLID SOLUTION TRI-METALLIC OXIDE/SULFIDE CATALYST AND PROCESS FOR ITS PREPARATION

[75] Inventors: Erek J. Erekson, LaGrange; Anthony L. Lee, Glen Ellyn, both of Ill.

[73] Assignee: Institute of Gas Technology, Chicago, Ill.

[21] Appl. No.: 364,473

[22] Filed: Jun. 9, 1989

[51] Int. Cl.$^5$ ............... B01J 21/06; B01J 23/78; B01J 27/043
[52] U.S. Cl. ............... 502/222; 502/219; 502/220; 502/303; 502/306; 502/307; 502/308; 502/309; 502/328; 502/329; 502/330; 502/332; 502/335; 502/336
[58] Field of Search ............... 502/219, 220, 222, 303, 502/306, 307, 308, 309, 328, 329, 330, 332, 335, 336

[56] References Cited

U.S. PATENT DOCUMENTS

| | | | |
|---|---|---|---|
| 3,116,345 | 12/1963 | Slaymaker | 260/683.15 |
| 4,151,191 | 4/1979 | Happel et al. | 260/449 M |
| 4,243,553 | 1/1981 | Naumann et al. | 252/439 |
| 4,243,554 | 1/1981 | Naumann et al. | 252/439 |
| 4,260,553 | 4/1981 | Happel et al. | 260/449 M |
| 4,320,030 | 3/1982 | Happel et al. | 252/432 |
| 4,431,747 | 2/1984 | Seiver et al. | 502/220 |
| 4,491,639 | 1/1985 | Happel et al. | 502/219 |
| 4,595,672 | 6/1986 | Ho et al. | 502/219 |
| 4,666,878 | 5/1987 | Jacobson et al. | 502/221 |
| 4,698,145 | 10/1987 | Ho et al. | 208/18 |
| 4,716,139 | 12/1987 | Jacobson et al. | 502/220 X |

Primary Examiner—W. J. Shine
Attorney, Agent, or Firm—Thomas W. Speckman; Douglas H. Pauley

[57] ABSTRACT

A mixed-solid solution tri-metallic oxide/sulfide catalyst having the formula:

$$M_IO_aS_b \cdot M_{II}O_c M_{III}O_d$$

wherein $M_I$ is iron, nickel, cobalt and mixtures thereof and mixtures with chromium, molybdenum, tungsten, and mixtures thereof; O is oxygen; S is sulfur; a is selected from zero and a number up to a positive real number representing the stoichiometric requirement, and b is selected from zero and a number up to a positive real number representing the stoichiometric requirement, provided one of a and b is a positive real number; $M_{II}$ is titanium, zirconium, hafnium, and mixtures thereof; c is a positive real number up to the stoichiometric requirement; $M_{III}$ is lithium, sodium, potassium, rubidium, cesium, francium, beryllium, magnesium, calcium, strontium, barium, radium, zinc, cadmium, mercury, scandium, yttrium, lanthanum, actinium, and mixtures thereof; and d is a positive real number up to the stoichiometric requirement; and wherein $M_IO_aS_b$ is mixed in a solid solution of $M_{II}O_c M_{III}O_d$. A process for production of the above catalyst and a process for removal of sulfur, nitrogen and oxygen from hydrocarbon liquids by contacting with a carbon containing compound and a mixed-solid solution tri-metallic oxide/sulfide catalyst.

20 Claims, No Drawings

MIXED-SOLID SOLUTION TRI-METALLIC OXIDE/SULFIDE CATALYST AND PROCESS FOR ITS PREPARATION

BACKGROUND OF THE INVENTION

1. Field of the Invention

This invention relates to mixed-solid solution tri-metallic oxide/sulfide catalysts useful for removal of at least one of sulfur, nitrogen and oxygen from hydrocarbon liquids. The active metallic catalyst is in oxide or sulfide form and mixed with a solid solution substrate of at least two metallic oxides. The catalysts are stable and active under high temperature conditions and are tolerant to sulfur containing feed materials. Removal of at least one of sulfur, nitrogen and oxygen from hydrocarbon liquids is achieved by contacting the hydrocarbon liquids with CO, $CO_2$, and $C_1$ to $C_4$ hydrocarbons in the presence of a mixed-solid solution tri-metallic oxide/sulfide catalyst.

2 Description of the Prior Art

Specific metal oxides and metal sulfides and mixtures of metal oxides and metal sulfides are known to serve as catalysts, particularly for low temperature hydrogenation reactions. Several U.S. Patents teach molybdenum sulfide catalysts and their use in methanation and hydrotreating processes: U.S. Pat. No. 4,431,747 teaching carbon containing molybdenum and tungsten sulfide catalysts; U.S. Pat. No. 4,666,878 teaching iron promoted molybdenum and tungsten sulfide catalysts; and U.S. Pat. Nos. 4,595,672 and 4,698,145 teaching promoted molybdenum and tungsten sulfide catalysts for hydroprocessing. U.S. Pat. No. 3,116,345 teaches a catalyst for hydroisomerization which is a sulfide of one or more metals of chromium, molybdenum, and tungsten and/or a sulfide of one or more metals of iron, cobalt and nickel on a solid support of silica, alumina, or mixed silica-zirconia. U.S. Pat. Nos. 4,243,553 and 4,243,554 teach molybdenum disulfide catalysts for hydrodenitrogenation and hydrodesulfurization. U.S. Pat. Nos. 4,151,191 and 4,260,553 teach mixed metallic catalysts of molybdenum oxides or sulfides, lanthanide and actinide oxides or sulfides; and aluminum, tungsten and silicon oxides may be used as methanation catalysts up to about 600° C. U.S. Pat. Nos. 4,320,030 and 4,491,639 teach vanadium, molybdenum or tungsten sulfide or mixed sulfide/oxide compounds which may contain aluminum, silicon, boron, cerium or titanium; cobalt, nickel, iron or manganese; carbon; and nitrogen for use as hydrogenation catalysts.

The applicants do not have knowledge of any tri-metallic oxide/sulfide catalysts wherein a first metallic oxide/sulfide is mixed with a solid solution of a second and third metallic oxide material. The applicants do not have knowledge of processes for catalytic removal of sulfur, nitrogen and/or oxygen from hydrocarbon liquids in the presence of a mixed-solid solution tri-metallic oxide/sulfide catalyst and a gaseous carbon-containing compound wherein hydrogen is present in only incidental amounts, certainly not in amounts to substantially effect hydrogenation reactions as taught by the prior art.

SUMMARY OF THE INVENTION

This invention provides a mixed-solid solution tri-metallic oxide/sulfide catalyst, a process for preparation of the catalyst, and a process for removal of at least one of sulfur, nitrogen and oxygen from hydrocarbon liquids including using the above catalyst. The catalysts of this invention include an active metal oxide or metal sulfide or mixtures thereof mixed with a solid solution substrate of a second metal oxide and a third metal oxide.

The mixed-solid solution tri-metallic oxide/sulfide catalyst has the formula:

wherein $M_I$ is selected from the group consisting of iron, nickel, cobalt and mixtures thereof and mixtures with a metal selected from the group consisting of chromium, molybdenum, tungsten, and mixtures thereof; O is oxygen; S is sulfur; a is selected from zero and a number up to a positive real number representing the stoichiometric requirement, and b is selected from zero and a number up to a positive real number representing the stoichiometric requirement, provided one of a and b is a positive real number; $M_{II}$ is selected from the group consisting of titanium, zirconium, hafnium, and mixtures thereof; c is a positive real number up to the stoichiometric requirement; $M_{III}$ is selected from the group consisting of lithium, sodium, potassium, rubidium, cesium, francium, beryllium, magnesium, calcium, strontium, barium, radium, zinc, cadmium, mercury, scandium, yttrium, lanthanum, actinium, and mixtures thereof; and d is a positive real number up to the stoichiometric requirement; and wherein $M_I O_a S_b$ is mixed in a solid solution of $M_{II}O_c M_{III}O_d$. By the terminology tri-metallic as used throughout this description and claims, it is meant that at least one metal from each of the groups $M_I$, $M_{II}$, and $M_{III}$ is present. There may be more than one metal from each of the groups $M_I$, $M_{II}$ and $M_{III}$ present.

The process for removal of at least one of sulfur, nitrogen and oxygen from hydrocarbon liquids according to this invention comprises contacting the hydrocarbon liquids with at least one carbon containing compound selected from the group consisting of CO, $CO_2$, $C_1$ to $C_4$ hydrocarbons, and mixtures thereof, in the presence of a mixed-solid solution tri-metallic oxide/sulfide catalyst having the formula:

wherein $M_I$ is selected from the group consisting of iron, nickel, cobalt, chromium, molybdenum, tungsten, and mixtures thereof; O is oxygen; S is sulfur; a is selected from zero and a number up to a positive real number representing the stoichiometric requirement, and b is selected from zero and a number up to a positive real number representing the stoichiometric requirement, provided one of a and b is a positive real number; $M_{II}$ is selected from the group consisting of titanium, zirconium, hafnium, and mixtures thereof; c is a positive real number up to the stoichiometric requirement; $M_{III}$ is selected from the group consisting of lithium, sodium, potassium, rubidium, cesium, francium, beryllium, magnesium, calcium, strontium, barium, radium, zinc, cadmium, mercury, scandium, yttrium, lanthanum, actinium, and mixtures thereof; and d is a positive real number up to the stoichiometric requirement; and wherein $M_I O_a S_b$ is mixed in a solid solution of $M_{II}O_c M_{III}O_d$; maintaining the temperature at about 100° to about 700° C.; maintaining the pressure at about 0 to about 300 psig; maintaining a liquid hourly space velocity of about 0.2 to about 5.0 Ft$^3$/Hr-Ft$^3$ catalyst; and maintaining a gas space velocity of about 500 to about 10,000 SCF/Hr-Ft$^3$ catalyst.

DESCRIPTION OF PREFERRED EMBODIMENTS

The metallic portion of the mixed-solid solution tri-metallic oxide/sulfide having the above formula, in a preferred embodiment, $M_I$ is a mixture of iron, and molybdenum, $M_{II}$ is zirconium, and $M_{III}$ is magnesium, calcium, yttrium and mixtures thereof. The solid solution of $M_{II}O_cM_{III}O_d$ is comprised of about 8 to about 56 weight percent $M_{III}O_d$, the remainder being $M_{II}O_c$, and in preferred embodiments the solid solution is comprised of about 10 to about 16 weight percent $M_{III}O_d$. The metallic oxide/sulfide portion $M_IO_aS_b$ comprises about 30 to about 75 weight percent of the total mixed-solid solution tri-metallic oxide/sulfide catalyst. In preferred embodiments the $M_IO_aS_b$ portion comprises about 45 to about 55 weight percent of the total mixed-solid solution tri-metallic oxide/sulfide catalyst.

The mixed-solid solution tri-metallic oxide/sulfide catalyst may have $M_IO_aS_b$ in pure oxide form or in sulfide form and in any mixture of oxides and sulfides. The metallic sulfide portion of the catalyst provides sulfur tolerance to the catalyst of this invention, allowing use of feedstocks containing sulfur. The solid solution portion of the catalyst, $M_{II}O_cM_{III}O_d$, must initially be in the oxide form. The solid solution of the second and third metallic oxide provides high temperature stability to the mixed-solid solution tri-metallic oxide/sulfide catalyst of the present invention.

The mixed-solid solution tri-metallic oxide/sulfide catalyst of this invention may be prepared by mixing $M_IO_aS_b$ metallic oxide/sulfide powder with a powder of solid solution $M_{II}O_cM_{III}O_d$. To prepare a powder of solid solution $M_{II}O_cM_{III}O_d$, a combination of $M_{II}O_c$ and $M_{III}O_d$ is prepared by preparing a liquid solution of one of $M_{II}O_c$ and $M_{III}O_d$ and a colloidal suspension of the other of $M_{II}O_c$ and $M_{III}O_d$ and forming a mixture of the colloidal suspension and liquid solution; or preparing a liquid solution of $M_{II}O_c$ and impregnating the liquid solution of $M_{II}O_c$ on powdered solid $M_{III}O_d$. Preferably an aqueous solution and an aqueous colloidal suspension are used. Preferably the aqueous solution is of the $M_{III}$ component initially in nitrate or chloride form. Any liquid solutions or suspensions which will retain the desired oxide form of the metal compound are satisfactory. Preferably the colloidal suspension of $M_{II}O_c$ and liquid solution of $M_{III}O_d$ is mixed to form a homogeneous mixture. The combination of $M_{II}O_c$ and $M_{III}O_d$ as formed above is dried at a sufficient temperature and for a sufficient time to expel volatile components. Prior to drying, the pH of the liquid in the combination of $M_{II}O_c$ and $M_{III}O_d$ may be adjusted to form a gel which will reduce drying requirements. In a preferred embodiment, drying takes place at a temperature in excess of about 110° C. following which the dried product is calcined at a temperature of about 700° to about 750° C. for a sufficient time, about two hours, to expel volatile portions resulting in solid solution $M_{II}O_c$-$M_{III}O_d$ powder. The $M_IO_aS_b$ metallic oxide/sulfide component is added to and mixed with the solid solution $M_{II}O_cM_{III}O_d$ powder to form the mixed-solid solution tri-metallic oxide/sulfide powder. The mixture is then crushed and sieved to an appropriately small mesh size of about −6 to about +40, preferably about −12 to about +20 for use as a catalyst. Conventional and well-known catalyst manufacturing techniques may be employed to produce the substantially uniform or homogeneous mixed-solid solution powder as described above. Shaping of the catalyst product may be effected according to conventional techniques of the art, particularly tableting, or pelleting or extrusion. The catalyst may be used directly on its solid solution metallic oxide support.

In preparation of the solid solution metallic oxide material according to this invention, the aqueous solution or mixed colloid suspension and aqueous solution, as described above, may be used to precipitate $M_{II}O$ and $M_{III}O$ by addition of ammonium hydroxide to a pH of about 7 to 8 followed by drying and calcining as described above.

The addition of the $M_IO_aS_b$ component to the solid solution metallic oxide may be achieved by dry mixing the powders or by any suitable impregnation, co-precipitation, ion exchange, or vapor deposition technique as is known to the art to obtain a mixed-solid solution tri-metallic oxide/sulfide catalyst of this invention. While mixing of the $M_IO_aS_b$ component with the solid solution powder, according to one embodiment of this invention, sulfur powder may be added to increase the sulfur content of the catalyst to enhance sulfur tolerance of the catalyst in use.

The active catalyst portion of the catalyst of this invention, the $M_IO_aS_b$ portion, in mixture with the solid solution metallic oxide substrate, provides a catalyst which is stable and does not lose appreciable catalytic activity up to process temperatures in the order of 2200° C. and certainly up to 1500° C. This high temperature stabilization is provided by the $M_{II}O_cM_{III}O_d$ solid solution which does not go through a phase change and provide materials which clog the reactor, as prior catalysts have done.

This invention provides a process for removal of at least one of sulfur, nitrogen and oxygen from hydrocarbon liquids in a low energy requirement process. The process comprises contacting the hydrocarbon liquids with at least one carbon containing compound selected from the group consisting of CO, $CO_2$, $C_1$ to $C_4$ hydrocarbons, and mixtures thereof, in the presence of a mixed-solid solution tri-metallic oxide/sulfide catalyst having the formula:

$$M_IO_aS_b\cdot M_{II}O_c\cdot M_{III}O_d$$

wherein $M_I$ is selected from the group consisting of iron, nickel, cobalt, chromium, molybdenum, tungsten, and mixtures thereof; 0 is oxygen; S is sulfur; a is selected from zero and a number up to a positive real number representing the stoichiometric requirement, and b is selected from zero and a number up to a positive real number representing the stoichiometric requirement, provided one of a and b is a positive real number; $M_{II}$ is selected from the group consisting of titanium, zirconium, hafnium, and mixtures thereof; c is a positive real number up to the stoichiometric requirement; $M_{III}$ is selected from the group consisting of lithium, sodium, potassium, rubidium, cesium, francium, beryllium, magnesium, calcium, strontium, barium, radium, zinc, cadmium, mercury, scandium, yttrium, lanthanum, actinium, and mixtures thereof; and d is a positive real number up to the stoichiometric requirement; and wherein $M_IO_aS_b$ is mixed in a solid solution of $M_{II}O_cM_{III}O_d$; maintaining the temperature at about 100° to about 700° C.; maintaining the pressure at about 0 to about 300 psig; maintaining a liquid hourly space velocity of about 0.25 to about 5.0 Ft$^3$/Hr-Ft$^3$ catalyst; and maintaining a gas space velocity of about 500 to about 10,000 SCF/Hr-Ft$^3$ catalyst.

Suitable hydrocarbon liquids useful as feedstocks in the process of this invention include raw hydrocarbon liquids derived from naturally occurring carbonaceous materials such as by treatment of coal, peat, oil shale, tar sands, rock asphalt, diatomite, gilsonite, crude oil, heavy oil, and natural gas liquids, and hydrocarbon liquids derived as industrial by-products such as from coke breeze, petroleum coke, culm/tailings from coal beneficiation, screening and washing, refuse derived fuel, residual oil, coal tar and oils, coal conversion carbonaceous by-products, naphtha, coke oven gas, and refinery gas. The process of this invention is particularly suited to removal of sulfur, nitrogen and oxygen from liquid products of coal conversion processes. The sulfur, nitrogen and oxygen removal process according to this invention does not require addition of hydrogen. Only incidental hydrogen is present, that is, hydrogen formed in the carbonaceous material conversion, less than 50 mole percent and generally less than 10 mole percent of the gas present. The carbon containing compound need not be in pure form, but may be in gaseous mixtures, such as natural gas, gas product from naturally occurring carbonaceous material conversion units, such as conversion of coal, shale and the like. Such gases may be product gases of the same sources as the hydrocarbon liquid feedstock. The process is carried out in a in a liquid/vapor/solid contactor wherein the temperature is maintained at about 100° to about 700° C., the pressure is maintained at about 0 to about 3000 psig, a liquid hourly space velocity of about 0.25 to about 5.0 Ft$^3$/Hr-Ft$^3$ catalyst is maintained, and a gas space velocity of about 500 to about 10,000 SCF/Hr-Ft$^3$ catalyst is maintained. In preferred embodiments the temperature is maintained at about 300° to about 500° C., the pressure is maintained at about 500 to about 1,000 psig, the liquid space velocity is about 0.5 to about 2.0 Ft$^3$/Hr-Ft$^3$ catalyst and the space velocity is about 1,000 to about 4,000 SCF/Hr-Ft$^3$ catalyst.

It is seen that by the process of this invention, the liquid (vapor) and gaseous products from a carbonaceous material conversion unit which operates in the order of 800° to 1700° C. may be passed with little quenching, to the reactor for catalytic sulfur, nitrogen and oxygen removal according to the present invention. The products of the sulfur, nitrogen and oxygen removal reactor may be subject to any further desired downstream separation and purification processes.

The process of this invention passes the vapor effluent directly from the natural carbonaceous material conversion reactor to a catalytic sulfur, nitrogen and oxygen removal reactor with reduced quenching and no acid gas removal steps. Further, the catalyst used in the sulfur, nitrogen and oxygen removal reactor according to this invention is not poisoned by sulfur-containing material products of the carbonaceous material conversion unit and therefore no pre-treatment is necessary prior to the sulfur, nitrogen and oxygen removal reactions, even when naturally occurring high sulfur materials are used as a feedstock to the carbonaceous material conversion unit.

The ability of the catalyst of this invention to function at higher temperatures than conventional gas removal processes and to tolerate sulfur significantly reduces overall process thermal input requirements, and physical plant size with the concomitant reduction in maintenance and operation costs.

The following Examples are set forth as exemplifying specific embodiments of the invention in detail and are not intended to limit the invention in any way.

EXAMPLE 1

An aqueous solution is prepared by dissolving 46.08 grams of calcium nitrate in 100 grams of deionized water. This aqueous solution is added to 600.97 grams of an aqueous colloidal suspension of zirconia (Nyacol Zr 10/20, a 20 weight percent ZrO$_2$ in nitric acid suspension, sold by PQ Corporation, P.O. Box 349, Ashland, MA 01721). The colloidal suspension and liquid solution is mixed by stirring, following which 5 ml. portions of ammonium hydroxide (20 grams concentrated ammonium hydroxide and 80 grams of deionized water) is added until the pH of the mixture is 8, at which time the mixture is gelled. This mixture is dried at 100° C. overnight and the resulting powder calcined at 650° C. for two hours resulting in a solid solution powder of calcium oxide and zirconium oxide. 47.35 grams of the prepared calcium oxide/zirconium oxide solid solution powder is mixed with 100 grams of powdered ammonium tetrathiomolybdate, 9.2 grams of cobalt oxalate powder, and 36.12 grams of sulfur powder in a bottle on a rolling mill for two hours. The resulting mixed-solid solution tri-metallic oxide/sulfide powder is charged into a quartz reactor which is heated to 300° C. with a flow of 100 cc/min. of nitrogen. The gas flow is then switched from nitrogen to a mixture of 1,000 ppm hydrogen sulfide in hydrogen at a rate of 100 cc/min. With the flowing mixture of hydrogen sulfide in hydrogen, the powder is heated to above 450° C. but below 530° C. for one hour following which it is cooled down to 300° C. in flowing hydrogen sulfide/hydrogen gas. The gas flow is then returned to nitrogen to cool the powder down to room temperature following which the resultant mixed-solid solution tri-metallic oxide/sulfide catalyst is pelleted to a particle size of −12 +20 mesh. The catalyst powder would have the following analyses:

| Element | Mole Ratio |
| --- | --- |
| molybdenum | 1.00 |
| zirconium | 0.66 |
| calcium | 0.30 |
| cobalt | 0.04 |
| oxygen | 1.66 |
| sulfur | 2.10 |

EXAMPLE 2

Carbon dioxide and sulfur was removed from hydrocarbon liquids product from a Lurgi gasifier using a mixed-solid solution tri-metallic catalyst having the mole ratio analysis: molybdenum 1.0; zirconium 0.7; calcium 0.3; oxygen 1.7; and sulfur 2.1. 12.68 grams of pelleted catalyst powder was packed into a ⅜ inch diameter stainless steel reactor. Oil feed of 0°–650° F. distillation cut of Lurgi gasifier coal tar oil having a density of 0.93 was fed to the reactor at a liquid space velocity of 1.5 Ft$^3$ liquid/Hr-Ft$^3$ catalyst. A carbon containing gas compound, as indicated, was passed in contact with the hydrocarbon liquid and catalyst at a gas space velocity of 2800 Ft$^3$/Hr-Ft$^3$ catalyst under the conditions shown in Table I for one hour with results as shown in Table 1.

TABLE 1

| Gas | Pressure psig | Temp. °C. | PRODUCT | | |
|---|---|---|---|---|---|
| | | | Liquid Recovered weight % | Sulfur Removal % | Nitrogen Removal % |
| $CH_4$ | 0 | 400 | 85 | 7 | 41 |
| $CH_4$ | 470 | 363 | 91 | 40 | 30 |
| $CO_2$ | 465 | 358 | 87 | 33 | 34 |

While in the foregoing specification this invention has been described in relation to certain preferred embodiments thereof, and many details have been set forth for purpose of illustration it will be apparent to those skilled in the art that the invention is susceptible to additional embodiments and that certain of the details described herein can be varied considerably without departing from the basic principles of the invention.

We claim:

1. A mixed-solid solution tri-metallic oxide/sulfide catalyst having the formula:

$$M_IO_aS_b \cdot M_{II}O_c \cdot M_{III}O_d$$

wherein
   $M_I$ is selected from the group consisting of iron, nickel, cobalt and mixtures thereof and mixtures with a metal selected from the group consisting of chromium, molybdenum, tungsten, and mixtures thereof;
   O is oxygen;
   S is sulfur;
   a is selected from zero and a number up to a positive real number representing the stoichiometric requirement, and
   b is selected from zero and a number up to a positive real number representing the stoichiometric requirement, provided one of a and b is a positive real number;
   $M_{II}$ is selected from the group consisting of titanium, zirconium, hafnium, and mixtures thereof;
   c is a positive real number up to the stoichiometric requirement;
   $M_{III}$ is selected from the group consisting of lithium, sodium, potassium, rubidium, cesium, francium, beryllium, magnesium, calcium, strontium, barium, radium, zinc, cadmium, mercury, scandium, yttrium, lanthanum, actinium, and mixtures thereof; and
   d is a positive real number up to the stoichiometric requirement; and
wherein $M_IO_aS_b$ is mixed in a solid solution of $M_{II}O_c \cdot M_{III}O_d$.

2. A mixed-solid solution tri-metallic oxide/sulfide catalyst according to claim 1 wherein $M_I$ comprises cobalt.

3. A mixed-solid solution tri-metallic oxide/sulfide catalyst according to claim 1 wherein $M_I$ comprises nickel.

4. A mixed-solid solution tri-metallic oxide/sulfide catalyst according to claim 1 wherein $M_I$ comprises iron.

5. A mixed-solid solution tri-metallic oxide/sulfide catalyst according to claim 1 wherein $M_{II}$ is zirconium.

6. A mixed-solid solution tri-metallic oxide/sulfide catalyst according to claim 1 wherein $M_{III}$ is selected from the group consisting of magnesium, calcium, and yttrium.

7. A mixed-solid solution tri-metallic oxide/sulfide catalyst according to claim 1 wherein $M_I$ is cobalt, $M_{II}$ is zirconium and $M_{III}$ is selected from the group consisting of magnesium, calcium, and yttrium.

8. A mixed-solid solution tri-metallic oxide/sulfide catalyst according to claim 1 wherein said solid solution is comprised of about 8 to about 56 weight percent $M_{III}O_d$.

9. A mixed-solid solution tri-metallic oxide/sulfide catalyst according to claim 1 wherein said solid solution is comprised of about 10 to about 16 weight percent $M_{III}O_d$.

10. A mixed-solid solution tri-metallic oxide/sulfide catalyst according to claim 1 wherein $M_IO_aS_b$ comprises about 30 to about 75 weight percent of said catalyst.

11. A mixed-solid solution tri-metallic oxide/sulfide catalyst according to claim 1 wherein $M_IO_aS_b$ comprises about 45 to about 55 weight percent of said catalyst.

12. A mixed-solid solution tri-metallic oxide/sulfide catalyst according to claim 1 wherein $M_I$ is cobalt, $M_{II}$ is zirconium and $M_{III}$ is selected from the group consisting of magnesium, calcium, and yttrium; said solid solution is comprised of about 8 to about 56 weight percent $M_{III}O_d$ and $M_IO_aS_b$ comprises about 30 to about 75 weight percent of said catalyst.

13. A mixed-solid solution tri-metallic oxide/sulfide catalyst according to claim 1 wherein $M_I$ is cobalt, $M_{II}$ is zirconium and $M_{III}$ is selected from the group consisting of magnesium, calcium, and yttrium; said solid solution is comprised of about 10 to about 16 weight percent $M_{III}O_d$ and $M_IO_aS_b$ comprises about 45 to about 55 weight percent of said catalyst.

14. A process for preparation of a mixed-solid solution tri-metallic oxide/sulfide catalyst having the formula:

$$M_IO_aS_b \cdot M_{II}O_c \cdot M_{III}O_d$$

wherein
   $M_I$ is selected from the group consisting of iron, nickel, cobalt and mixtures thereof and mixtures with a metal selected from the group consisting of chromium, molybdenum, tungsten, and mixtures thereof;
   O is oxygen;
   S is sulfur;
   a is selected from zero and a number up to a positive real number representing the stoichiometric requirement, and
   b is selected from zero and a number up to a positive real number representing the stoichiometric requirement, provided one of a and b is a positive real number;
   $M_{II}$ is selected from the group consisting of titanium, zirconium, hafnium, and mixtures thereof;
   c is a positive real number up to the stoichiometric requirement;
   $M_{III}$ is selected from the group consisting of lithium, sodium, potassium, rubidium, cesium, francium, beryllium, magnesium, calcium, strontium, barium, radium, zinc, cadmium, mercury, scandium, yttrium, lanthanum, actinium, and mixtures thereof; and
   d is a positive real number up to the stoichiometric requirement; and wherein $M_IO_aS_b$ is mixed in a solid solution of $M_{II}O_c\cdot M_{III}O_d$, said process comprising: preparing a colloidal suspension of one of $M_{II}O_c$ and $M_{III}O_d$;

preparing a liquid solution of the other of $M_{II}O_c$ and $M_{III}O_d$;

mixing to form a mixture of said colloidal suspension and said liquid solution;

drying and calcining said mixture to form a solid solution powder comprising $M_{II}O_cM_{III}O_d$;

adding and mixing $M_IO_aS_b$ to said solid solution powder to form said mixed-solid solution tri-metallic oxide/sulfide catalyst.

15. A process according to claim 14 wherein said colloidal suspension is an aqueous suspension.

16. A process according to claim 14 wherein $M_{III}$ is in the form of a salt selected from the group consisting of nitrate, chloride, and mixtures thereof in preparing said liquid solution of $M_{III}O_d$.

17. A process according to claim 16 wherein said liquid solution is an aqueous solution of $M_{III}O_d$.

18. A process according to claim 14 wherein said colloidal suspension and said liquid solution are aqueous.

19. A process for preparation of a mixed-solid solution tri-metallic oxide/sulfide catalyst having the formula:

$$M_IO_aS_b\cdot M_{II}O_c M_{III}O_d$$

wherein $M_I$ is selected from the group consisting of iron, nickel, cobalt and mixtures thereof and mixtures with a metal selected from the group consisting of chromium, molybdenum, tungsten, and mixtures thereof;

O is oxygen;

S is sulfur;

a is selected from zero and a number up to a positive real number representing the stoichiometric requirement, and b is selected from zero and a number up to a positive real number representing the stoichiometric requirement, provided one of a and b is a positive real number;

$M_{II}$ is selected from the group consisting of titanium, zirconium, hafnium, and mixtures thereof;

c is a positive real number up to the stoichiometric requirement;

$M_{III}$ is selected from the group consisting of lithium, sodium, potassium, rubidium, cesium, francium, beryllium, magnesium, calcium, strontium, barium, radium, zinc, cadmium, mercury, scandium, yttrium, lanthanum, actinium, and mixtures thereof; and d is a positive real number up to the stoichiometric requirement; and wherein $M_IO_aS_b$ is mixed in a solid solution of $M_{II}O_c\cdot M_{III}O_d$, said process comprising:

preparing a liquid solution of $M_{II}O_c$ and $M_{III}O_d$;

drying and calcining said liquid solution to form a solid solution powder comprising $M_{II}O_cM_{III}O_d$;

adding and mixing $M_IO_aS_b$ to said solid solution powder to form said mixed-solid solution tri-metallic oxide/sulfide catalyst.

20. A process according to claim 19 wherein said solution is an aqueous solution.

* * * * *